(12) United States Patent
Stommel

(10) Patent No.: US 7,726,943 B2
(45) Date of Patent: Jun. 1, 2010

(54) ROTOR BLADE FOR A WIND ENERGY INSTALLATION

(75) Inventor: Matthias Stommel, Ganderkesee (DE)

(73) Assignee: Daubner & Stommel GbR Bau-Werk-Planung (DE)

( * ) Notice: Subject to any disclaimer, the term of this patent is extended or adjusted under 35 U.S.C. 154(b) by 644 days.

(21) Appl. No.: 11/554,614

(22) Filed: Oct. 31, 2006

(65) Prior Publication Data

US 2007/0110584 A1 May 17, 2007

(30) Foreign Application Priority Data

Nov. 14, 2005 (DE) ........................ 10 2005 054 594

(51) Int. Cl.
  *F01D 5/12* (2006.01)
  *B64C 11/24* (2006.01)
  *F03D 7/02* (2006.01)

(52) U.S. Cl. ........................................ 416/61; 416/233

(58) Field of Classification Search ............. 416/223 R, 416/231 R, 231 B, 232, 233; 290/44, 55
See application file for complete search history.

(56) References Cited

U.S. PATENT DOCUMENTS

| 2,932,470 | A | * | 4/1960 | Edkins | 244/219 |
| 3,129,908 | A | * | 4/1964 | Harper | 244/219 |
| 3,604,666 | A | * | 9/1971 | Achberger | 244/134 A |
| 3,623,684 | A | * | 11/1971 | Kline | 244/134 A |
| 4,494,715 | A | * | 1/1985 | Weisend, Jr. | 244/134 A |
| 4,561,613 | A | * | 12/1985 | Weisend, Jr. | 244/134 A |
| 4,779,823 | A | * | 10/1988 | Ely et al. | 244/134 A |
| 5,106,265 | A | * | 4/1992 | Holzem | 416/23 |
| 5,449,133 | A | * | 9/1995 | Ely et al. | 244/134 A |
| 6,398,501 | B1 | * | 6/2002 | Darkins et al. | 416/226 |
| 6,940,185 | B2 | * | 9/2005 | Andersen et al. | 290/44 |
| 7,086,834 | B2 | * | 8/2006 | LeMieux | 416/1 |

FOREIGN PATENT DOCUMENTS

| DE | 32 32 361 A1 | 8/1982 |
| DE | 195 28 862 A1 | 8/1995 |
| DE | 197 19 221 C1 | 5/1997 |
| DE | 101 52 449 A1 | 10/2001 |
| DE | 102 33 102 A1 | 7/2002 |
| DE | 103 37 708 A1 | 8/2003 |

OTHER PUBLICATIONS

DE Search Report No. 10 2005 054 594.7 dated Sep. 6, 2006.

* cited by examiner

*Primary Examiner*—Edward Look
*Assistant Examiner*—Sean J Younger
(74) *Attorney, Agent, or Firm*—Smith, Gambrell & Russell

(57) ABSTRACT

The invention relates to a rotor blade (22) for a wind energy installation (10), with the rotor blade (22) having at least one cavity (28). The cavity (28) is sealed to be gas-tight and is filled with gas, in particular air, in order to prestress the rotor blade (22), with the pressure of the gas being greater than or less than the average air pressure to be expected at the point of use of the rotor blade.

18 Claims, 2 Drawing Sheets

ROTOR BLADE FOR A WIND ENERGY INSTALLATION

STATEMENT OF RELATED APPLICATIONS

This patent application claims priority on German Patent Application No. 10 2005 054 594.7, having a filing date of 14 Nov. 2005, which is incorporated herein in its entirety by this reference.

BACKGROUND OF THE INVENTION

1. Technical Field

The present invention relates to a rotor blade for a wind energy installation, with the rotor blade having at least one cavity. The invention also relates to a method for operation of a wind energy installation having a rotor which can be driven by wind and has at least one rotor blade of the abovementioned type, having a generator for conversion of the mechanical energy of the rotor to electrical energy, and having a tower on which the rotor is arranged.

2. Related Art

The rotor blades for wind energy installations are subject to high loads. Over the course of an assumed operating life of, for example, twenty years the rotor blades rotate at least 300 to 500 million times. Frequent alternating bending loads, in particular, occur during this process and have an extremely negative effect on the life of the individual rotor blade. Rotor blades are normally composed of an upper shell and a lower shell, with the shells being connected by lateral webs, which give the rotor blade sufficient bending stiffness. The webs as well as the connections of the webs to the upper shell and to the lower shell—frequently adhesively bonded joints—in particular are subject to compression and tension alternately during operation.

BRIEF SUMMARY OF THE INVENTION

Against the background of this prior art, one object of the present invention is to specify a rotor blade of the initially mentioned type for a wind energy installation in which alternating loads are reduced, or prevented as far as possible, in comparison to the rotor blades which are used in the prior art. A further object of the present invention is to specify a method for operation of a wind energy installation of the type mentioned initially, in which a rotor blade such as this is used.

This object is achieved by a rotor blade for a wind energy installation, with the rotor blade having at least one cavity characterized in that the cavity is sealed to be gas-tight and is filled with gas, in particular air, in order to prestress the rotor blade, with the pressure of the gas being greater than or less than the average air pressure to be expected at the point of use of the rotor blade.

A rotor blade according to the invention for wind energy installation in this case has at least one cavity which is sealed to be gas-tight and is filled with gas, in particular air, in order to prestress the rotor blade, with the pressure of the gas being greater than or less than the average air pressure that is normally to be expected at the installation location of the wind energy installation, that is to say at the point of use of the rotor blade. For the purposes of this application, the term gas expressly includes gas mixtures.

The increased pressure or the vacuum pressure which is produced in the cavity or within the rotor blade prestresses the rotor blade with corresponding forces which act inwards or outwards, that is to say operating loads are as far as possible raised or exceeded, so that alternating loads no longer occur during operation, or only minor alternating loads still occur. The level of the increased pressure or vacuum pressure that is preferably created is in this case, of course, dependent on various influencing factors, such as the materials used for the rotor blade, its dimensions and the like. With regard to the cavity, it is important for it to be designed and to be arranged within the rotor blade in such a way as to achieve prestressing of at least individual components of the rotor blade, in particular those which are subject to an alternating load.

In one preferred embodiment, the entire rotor blade is designed in the normal manner as a hollow body with an upper shell and lower shell, in particular and preferably with a cohesive cavity being formed which is bounded on the outside by the upper shell and lower shell. The walls of the cavity can accordingly be formed directly by the upper shell and lower shell, and lateral webs can be provided within this cavity, connecting the lower shell and the upper shell to one another. As those skilled in the art in this field are aware, a large number of other embodiments are feasible in which one or more gas-tight and gas-filled cavities according to the invention are formed.

If the air pressure to be expected at the point of use of the rotor blade varies greatly depending on the weather situation, then the level of the pressure of the gas which is located in the cavity is preferably chosen such that it is at least outside the level interval which is predetermined by the lowest air pressure level to be expected and the highest air pressure level to be expected. The important factor is to ensure that, at the point of use, the rotor blade is prestressed either by increased pressure or vacuum pressure within the cavity.

The cavity in the rotor blade can have an appropriate gas, which is at an increased pressure or at a vacuum pressure, applied to it even during its production by means of a pressure source, in particular a compressor, or a vacuum-pressure source, in particular a pump. Air is expediently considered for this purpose. However, it is also possible to provide for inert gases to be used, for example as an additional precaution against internal corrosion processes on the rotor blade.

In one preferred embodiment of the present invention, one or more inlet and/or outlet openings is or are arranged in one or more walls which bound the cavity, via which the gas can be introduced from the outside into the cavity, and/or via which the gas can be passed to the outside from the cavity. In one simple embodiment, only one opening is provided, and can be used both as an inlet and as an outlet. However, it is expedient to provide at least two openings, specifically respectively separate inlet and outlet openings.

Inlet and/or outlet openings such as these allow the cavity in the rotor blade to be filled with—in particular additional—gas, or gas to be allowed out in order to increase or to reduce the pressure in the cavity in the rotor blade during operation, that is to say when the rotor blade is arranged on a rotor of a wind energy installation. For this purpose, the rotor blade expediently has valves via which the gas inlet and/or outlet into or from the cavity can be controlled. In principle, the valves can also be arranged outside the rotor blade, for example within the pod and/or at the pressure source or the vacuum-pressure source. Corresponding inlet and/or outlet lines can lead to the inlet and/or outlet openings on the rotor blade.

According to one autonomous aspect of the present invention is a method for operation of a wind energy installation having a rotor which can be driven by wind and has at least one rotor blade having a generator for conversion of the mechanical energy of the rotor to electrical energy, and having a tower on which the rotor is arranged, characterized in that the actual pressure and/or actual humidity and/or the actual temperature of the gas which is located in the cavity are/is measured, with the pressure within the cavity being increased or decreased, and/or the gas within the cavity being at least partially, but preferably completely, replaced as a function of the actual pressure and/or the actual humidity and/or the actual temperature.

This embodiment of the invention is a method is specified for operation of a wind energy installation having a rotor blade of the type described above, in which the actual pressure and/or actual humidity and/or the actual temperature of the gas which is located in the cavity of the rotor blade are/is measured, with the pressure within the cavity being increased or decreased, and/or the gas within the cavity being at least partially, but preferably completely, replaced as a function of the actual pressure and/or the actual humidity and/or the actual temperature. This ensures that external temperature fluctuations in the vicinity of the wind energy installation, which lead to pressure fluctuations within the rotor blade cavity, can be compensated for. In addition, if required, humidity that occurs within the cavity can be transported to the outside by replacing the gas by new gas with less humidity if the humidity exceeds a specific value.

A wind energy installation which operates according to this method has a control device which controls the pressure source and/or the vacuum-pressure source as a function of the corresponding actual values of the gas within the cavity. The pressure source and/or the vacuum-pressure source are/is in this case arranged, in one preferred embodiment, outside the rotor blade, for example within the tower of the wind energy installation or within the pod.

In order to measure the abovementioned actual values of the gas within the cavity, the rotor blade has a pressure sensor and/or a humidity sensor and/or a temperature sensor. These sensors are expediently arranged within the cavity. However, they are at least connected in a communicating fashion to the cavity.

BRIEF DESCRIPTION OF THE DRAWINGS

Further features of the present invention result from the attached claims, the following description of one preferred exemplary embodiment, and from the attached drawings, in which:

DETAILED DESCRIPTION OR PREFERRED EMBODIMENTS

Figure 1:
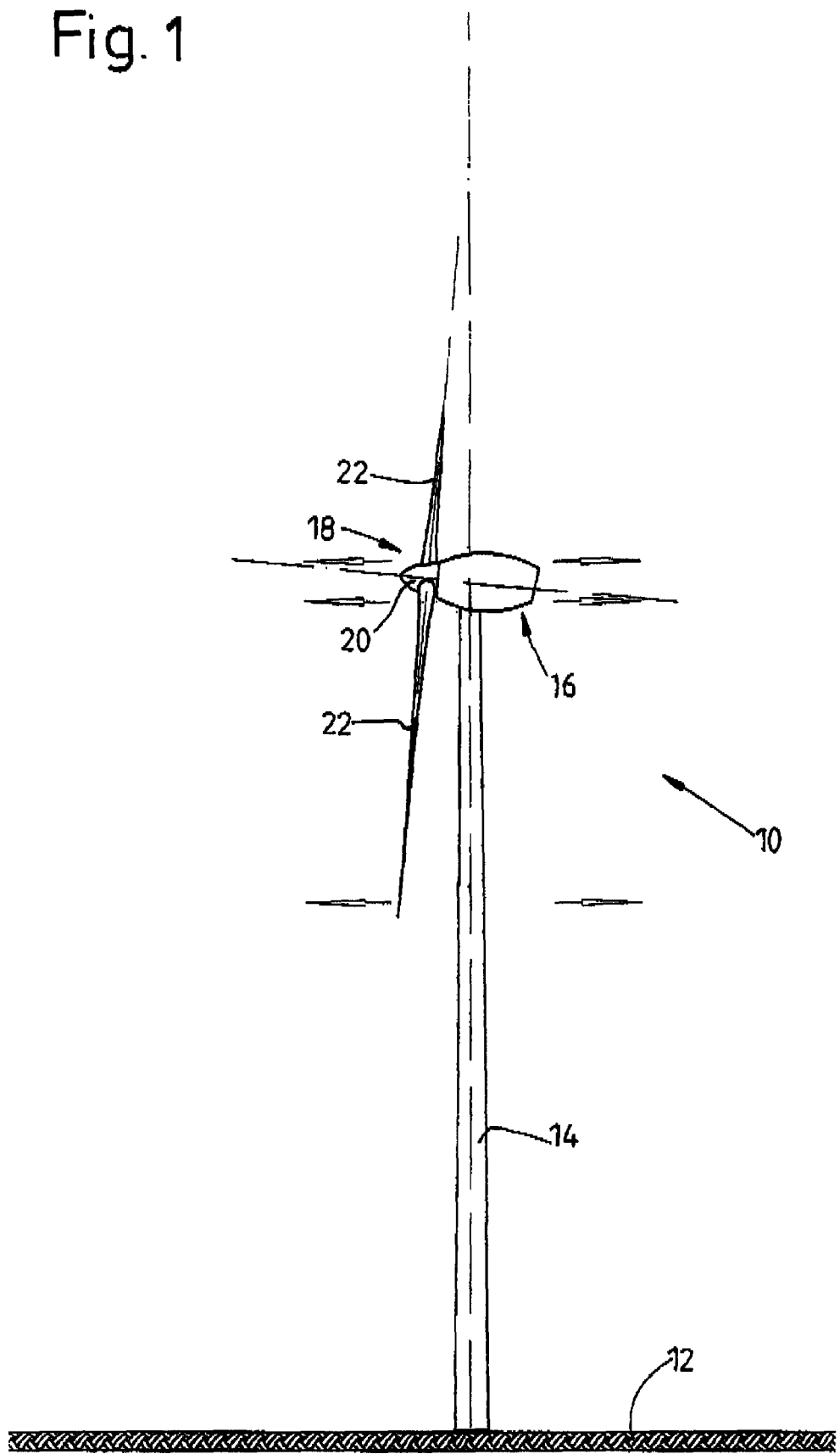
FIG. 1 shows a side view of the wind energy installation with a rotor blade according to the invention.

FIG. 1 illustrates a wind energy installation 10 which has a pod 16, which is arranged at the top of the tower, at the upper end of a vertical tower 14 which is arranged on a horizontal foundation 12. As those skilled in the art in this field know, a wide range of embodiments are feasible for the detailed design of a tower for a wind energy installation. The invention is, of course, not restricted to the truncated-conical form of the tower 14 described in the drawing.

A rotor 18 is arranged at an end of the pod 16 facing the wind, and has a hub 20. Three rotor blades 22 are connected to the hub 20, with the rotor blade roots of the rotor blades 22 being inserted into corresponding openings in the hub 20, and being connected to it in a known manner.

The rotor 18 rotates about an axis which is inclined slightly upwards with respect to the horizontal. As soon as wind strikes the rotor blades 22, the rotor 18 together with the rotor blades 22 is caused to rotate about the rotor axis. The movement of the rotor shaft is converted to electrical power by a generator which is arranged within the pod. The rotor blades 22 cover a circular area during rotation. The position of the rotor blades 22 with respect to the wind can be varied individually, that is to say the incidence angle of the rotor blades 22 with respect to the wind can be adjusted, by means of an adjustment device which is not illustrated but is known to those skilled in the art in this field.

The fundamental design of the wind energy installation 10 with an at least approximately horizontal rotor axis is known from the prior art, and will therefore not be described in detail.

Figure 2:
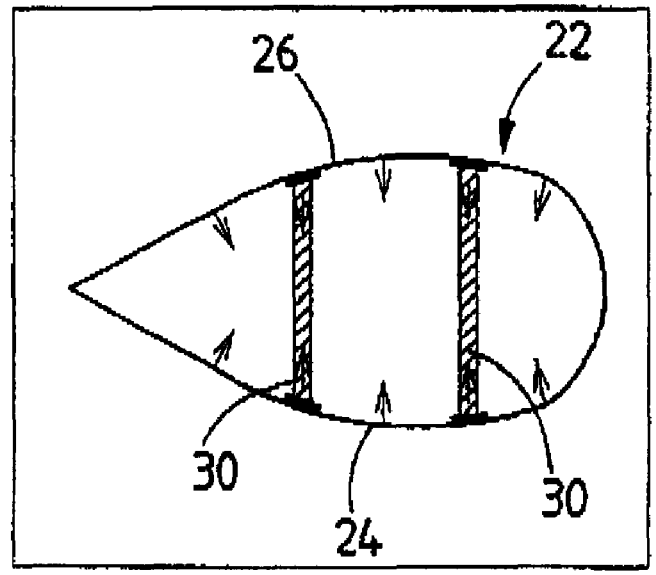
FIG. 2 shows a cross section through a rotor blade according to the invention, which is filled with a gas at a vacuum pressure.
Figure 3:
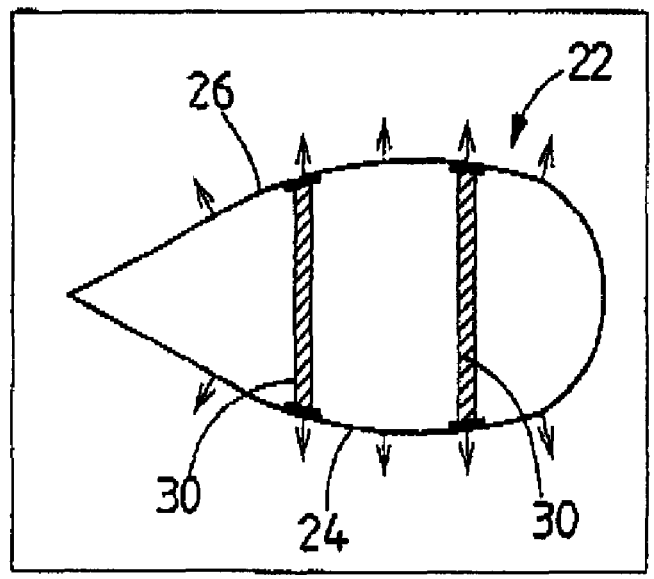
FIG. 3 shows a cross section through a rotor blade according to the invention, which is filled with a gas at an increased pressure.

Each rotor blade 22 comprises a lower shell 24, which can be seen in particular in FIGS. 2 and 3, as well as an upper shell 26, which are connected to one another in the longitudinal direction of the rotor blade 22. The materials of the lower shell 24 and of the upper shell 26 as well as the connections between them are designed in such a manner that the cavity 28 in the interior of the rotor blade 22, that is to say the cavity 28 which is surrounded by the lower shell 24 and the upper shell 26, is sealed to be gas-tight, in particular air-tight, from the surrounding air.

The rotor blades 22, that is to say the respective cavities 28, are filled with a gas, specifically air. In principle, there may be either a vacuum pressure or an increased pressure in the respective cavity 18 in this case, in order to achieve the success according to the invention:

In the rotor blade 22 shown in FIG. 2, there is a vacuum pressure in comparison to the mean air pressure at the point of use of the wind energy installation 10, so that the greater air pressure on the outside results in forces in the direction of the interior of the rotor blade 22, as is indicated by the arrows pointing inwards. This results in the rotor blade 22 being prestressed. In particular, the illustrated forces also lead to defined pressure loads on webs 30 which are arranged in the interior and connect the lower shell 24 and the upper shell 26. The defined pressure load is selected by adjustment of the vacuum pressure such that the pressure forces in particular on the webs 30 are greater than the tensile forces which occur during operation of the wind energy installation 10 and act on the webs 30 as a result of external influences. In consequence, the tensile forces which occur during operation are cancelled out, or even overcompensated for, that is to say suppressed. Thus, overall, the rotor blade 22 is subject exclusively to pressure loads during operation, thus avoiding particularly damaging alternating loads.

In the rotor blade 22 shown in FIG. 3, the pressure is increased in comparison to the mean air pressure at the point of use of the wind energy installation 10. Pressure loads in particular on the webs 30 of the rotor blade 22 are avoided, provided that the increased pressure in the cavity 28 is chosen to be sufficiently high. The increased pressure and the prestressing of the rotor blade 22 resulting from it result in defined tensile forces acting on the webs 30. These defined tensile forces compensate or overcompensate for the external compression forces which occur during operation, so that, overall, the rotor blade 22 is subject only to tension loads. Damaging alternating loads, that is to say alternation between tensile loads and compressive loads, are avoided.

The wind energy installation 10 as shown in FIG. 1 and with a rotor blade 22 in which increased pressure occurs or is produced as shown in FIG. 3 will be described in the following text.

For this purpose, a compressed-air source, specifically a compressor, which is not illustrated is arranged in the interior of the pod 16. The compressor is connected to each rotor blade 22 via lines which are not illustrated. For this purpose, each rotor blade 22 has an inlet opening and an outlet opening in the area of the root. Each inlet opening is connected to the compressor via corresponding lines, and each outlet opening is connected to the surrounding air via a controllable valve and corresponding lines.

Each rotor blade 22 can be separately filled with compressed air, until the pressure has been increased, by means of the compressor. The increased pressure in the rotor blade 22 therefore need not be created during production of the rotor blade 22, but can be provided once it has already been integrated in the wind energy installation 10. The outlet opening, which can be controlled by a valve, makes it possible to equalize the pressure with the surrounding air, that is to say to reduce the pressure. This means that it is thus possible to reduce the pressure within the rotor blade 22 to a desired level, with the lowest possible level corresponding to the air pressure in the surrounding area.

Sensors are in each case arranged within the rotor blade 22 and measure the air humidity, the temperature and the pressure within the cavity 28.

As soon as the measured actual pressure in the cavity 28 falls below a predetermined minimum value as a result of external temperature fluctuations, the compressor is switched on by means of an appropriate control device, and the pressure within the relevant rotor blade 22 is raised to a predetermined nominal value. If the actual pressure in the cavity 28 rises above a predetermined maximum value as a result of high outside temperatures in the area of the wind energy installation 10, the outlet valve can be opened, so that compressed air can emerge from the cavity 28 until the pressure is reduced to a predetermined nominal value.

If the humidity sensor measures an actual value which is above a nominal value that is predetermined by the control device, the air in the interior of the rotor blade 22 can be replaced by drier air by means of the compressor and the inlet and outlet openings.

There are a wide range of options for the individual control processes, which those skilled in the art in this field are aware of.

List of Reference Symbols

| | |
|---|---|
| 10 | Wind energy installation |
| 12 | Foundation |
| 14 | Tower |
| 16 | Pod |
| 18 | Rotor |
| 20 | Hub |
| 22 | Rotor blade |
| 24 | Lower shell |
| 26 | Upper shell |
| 28 | Cavity |
| 30 | Web |

What is claimed is:

1. A rotor blade for a wind energy installation, with the rotor blade comprising at least one sealed, gas-tight cavity (28) and that is filled with gas, the cavity being disposed within the rotor blade (22), wherein:

(a) the pressure of the gas within the cavity (28) is greater than or less than the average air pressure to be expected at the point of use of the rotor blade (22); and (b) the pressure of the gas within the cavity (28) generates a prestressing of the rotor blade (22) that counteracts external forces acting on the rotor blade (22).

2. The rotor blade according to claim 1, further comprising at least one inlet or outlet openings is or are arranged in one or more walls (24, 26) which bound the cavity (28), via which the gas is introduced from the outside into the cavity (28), or via which the gas is passed to the outside from the cavity (28).

3. The rotor blade according to claim 2, wherein the rotor blade (22) further comprises valves via which the gas inlet or outlet into or from the cavity (28) is controlled.

4. The rotor blade according to claim 2, wherein the at least one inlet or outlet openings is or are arranged in the area of the rotor blade root.

5. The rotor blade according to claim 1, the rotor blade (22) further comprises a lower shell (24) and an upper shell (26) with lateral webs (30) running between the lower shell (24) and the upper shell (26).

6. The rotor blade according to claim 1, wherein the rotor blade (22) further comprises a pressure sensor, by means of which the pressure within the cavity (28) is measured.

7. The rotor blade according to claim 1, wherein the rotor blade (22) further comprises a humidity sensor, by means of which the humidity within the cavity (28) is measured.

8. The rotor blade according to claim 1, wherein the rotor blade (22) further comprises a temperature sensor, by means of which the temperature within the cavity (28) is measured.

9. A wind energy installation comprising:
a rotor (18) which can be driven by wind, comprising at least one rotor blade (22) comprising at least one sealed, gas-tight cavity (28) that is filled with gas, the cavity being disposed within the rotor blade (22), wherein:
(a) the pressure of the gas within the cavity (28) is greater than or less than the average air pressure to be expected at the point of use of the rotor blade (22); and
(b) the pressure of the gas within the cavity (28) generates a prestressing of the rotor blade (22) that counteracts external forces acting on the rotor blade (22);
a generator for conversion of mechanical energy produced by the rotor (18) to electrical energy; and
a tower (14) on which the rotor (18) is arranged.

10. The wind energy installation according to claim 9, further comprising a pressure source or a vacuum-pressure source, which is connected via lines to the cavity (28) of the rotor blade (22).

11. The wind energy installation according to claim 10, further comprising a closed-loop control device, via which the pressure source or the vacuum-pressure source is controlled as a function of the actual pressure an or the actual humidity or the actual temperature of the gas within the cavity (28).

12. The rotor blade according to claim 1, wherein the gas is air.

13. The wind energy installation according to claim 9, wherein the gas is air.

14. The rotor blade according to claim 3, wherein the at least one inlet or outlet openings is or are arranged in the area of the rotor blade root.

15. The rotor blade according to claim 2, wherein the rotor blade (22) further comprises a lower shell (24) and an upper shell (26) with lateral webs (30) running between the lower shell (24) and the upper shell (26).

16. The rotor blade according to claim 4, wherein the rotor blade (22) further comprises a lower shell (24) and an upper shell (26) with lateral webs (30) running between the lower shell (24) and the upper shell (26).

17. A rotor blade for a wind energy installation, with the rotor blade comprising:
    (a) at least one sealed, gas-tight cavity (28) that is filled with gas, the cavity being disposed within the rotor blade (22), wherein:
        (i) the pressure of the gas within the cavity (28) is greater than or less than the average air pressure to be expected at the point of use of the rotor blade (22), and
        (ii) the pressure of the gas within the cavity (28) generates a prestressing of the rotor blade (22) that counteracts external forces acting on the rotor blade (22);
    (b) at least one inlet or outlet opening arranged in one or more walls (24, 26) which bound the cavity (28), via which the gas is introduced from the outside into the cavity (28), or via which the gas is passed to the outside from the cavity (28), wherein the at least one inlet or outlet opening is arranged in the area of the rotor blade root; and
    (c) at least one sensor by means of which a measurement within the cavity (28) is measured, the at least one sensor being selected from the group consisting of pressure sensors, humidity sensors, temperature sensors, and combinations thereof.

18. The rotor blade according to claim 17, wherein the rotor blade (22) further comprises a lower shell (24) and an upper shell (26) with lateral webs (30) running between the lower shell (24) and the upper shell (26).

* * * * *